INVENTOR.
LEONARD H. REIMER

INVENTOR.
LEONARD H. REIMER

United States Patent Office 3,543,514
Patented Dec. 1, 1970

3,543,514
UNCOUPLING VALVE FOR HYDROSTATIC
TRANSMISSION
Leonard H. Reimer, Hutchinson, Kans., assignor to The
Cessna Aircraft Company, Wichita, Kans., a corporation of Kansas
Filed Feb. 7, 1969, Ser. No. 797,529
Int. Cl. F16d 31/06
U.S. Cl. 60—53                                              11 Claims

ABSTRACT OF THE DISCLOSURE

The invention is an improved uncoupling valve in a hydrostatic transmission utilized in an automotive vehicle. The valve allows the transmission to free wheel as soon as the power from the primary engine is shut off by venting the pressure between the elements of the transmission. The valve is actuated when the low pressure from a system charging pump is cut off from the valve or when a damaging pressure level is approached in the loop circuit connecting the pump and motor, thus giving the valve a secondary function as a high pressure relief valve.

---

This invention relates to a hydraulic transmission mechanism for use on motorized vehicles and the like. Hydromechanical transmissions of this type include the elements of an axial piston fluid pump connected in driving relation to a similar type fluid motor and are commonly referred to in the trade as hydrostatic transmissions. A transmission similar to the present invention is illustrated in U.S. Pat. No. 3,131,540 to Ritter.

More particularly, the present invention is concerned with a pilot operated control valve which relieves the pressure in the closed loop flow paths between the pump and motor of the transmission, allowing it to uncouple or free wheel whenever the power source is shut down. The valve also acts as a high pressure relief valve when excessive loads are experienced in the closed loop.

Whenever a vehicle utilizing a conventional hydrostatic transmission is brought to rest and the power source or primary engine is shut down, the power train momentarily remains locked due to the pressurized fluid trapped in the closed loop. As the fluid inevitably leaks out, the pump and motor become disengaged from each other and the vehicle is subject to coasting if the brakes have not been set. The present invention assures that as soon as the vehicle's engine stops the uncoupling valve unlocks the transmission, thus preventing a dangerous condition from arising.

It is therefore the principal objective of the present invention to provide a new and improved uncoupling or declutching control for a hydrostatic transmission which can be operated by a manual or automatic operator.

Another object of the invention is to provide a simple and compact uncoupling valve which also has a high pressure relief function in a hydrostatic transmission.

A further object of the present invention is to provide an uncoupling valve which assists in lubricating the transmission.

Further objects and advantages of the invention will be apparent when the following description is read in connection with the accompanying drawings in which.

Figure 1:
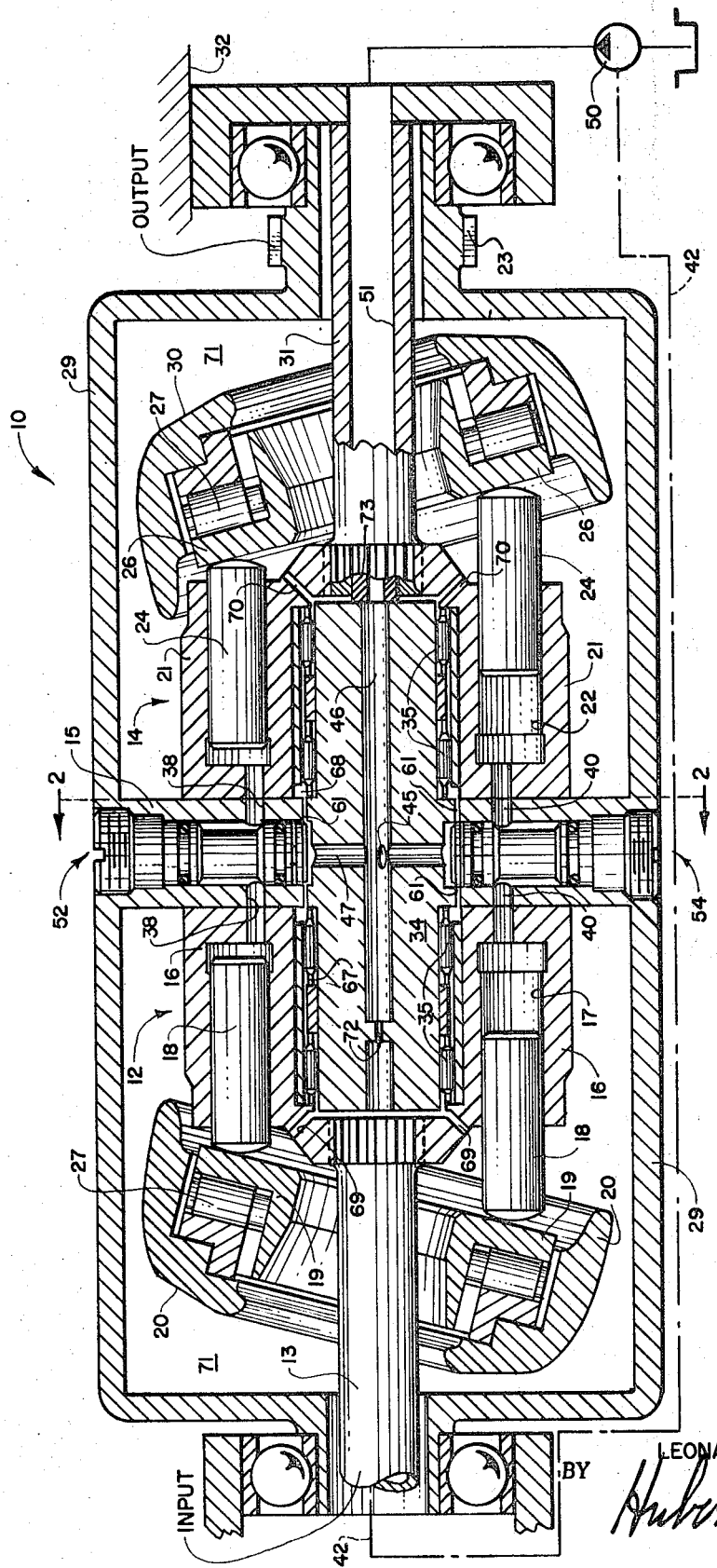
FIG. 1 is an axial sectional view of a hydrostatic transmission embodying the uncoupling valve of the present invention with the charging pump symbolically illustrated.

Referring now to the drawings for a more detailed description of the invention, and more specifically to FIG. 1, the transmission is generally identified by reference number 10. The transmission 10 comprises an axial piston pump 12 communicating through a closed loop fluid path with an axial piston motor 14. The pump and motor are separated by a port plate 15. The pump 12 is driven by a primary power source (not shown) through a drive shaft 13. The output from the transmission is taken from a pinion gear 23, mounted on the right end of a rotating housing 29.

The pump 12 includes a rotatably mounted cylinder block 16 splined to drive shaft 13. Contained within the cylinder block are cylinders 17 having reciprocating pistons 18, the ends of which bear against a plate 19. Roller bearings 27 support the plate 19 on the pump cam plate 20.

The motor 14, having a structure similar to the pump 12, includes a cylinder block 21, cylinders 22 and piston 24. Plate 26 rotatably mounted on motor cam plate 30 bears against the ends of pistons 24. The cylinder block 21 does not rotate. It is mounted on a splined shaft 31 which in turn is anchored to a stationary mount 32. The port plate 15, positioned between the pump 12 and motor 14, is mounted midway on a central main shaft 34 which rotatably supports both cylinder blocks 16 and 21 through bearings 35. The port plate 15 is secured to housing 29. The pump and motor cam plates 20 and 30, also referred to in the trade as swash plates, are both mounted in the housing 29 in a conventional manner and therefore rotate with the port plate 15 and housing 29. The structure for mounting and tilting the cam plates, which is well known in the art, is illustrated by U.S. Pat. No. 3,313,108 to Allgaier.

Figure 2:
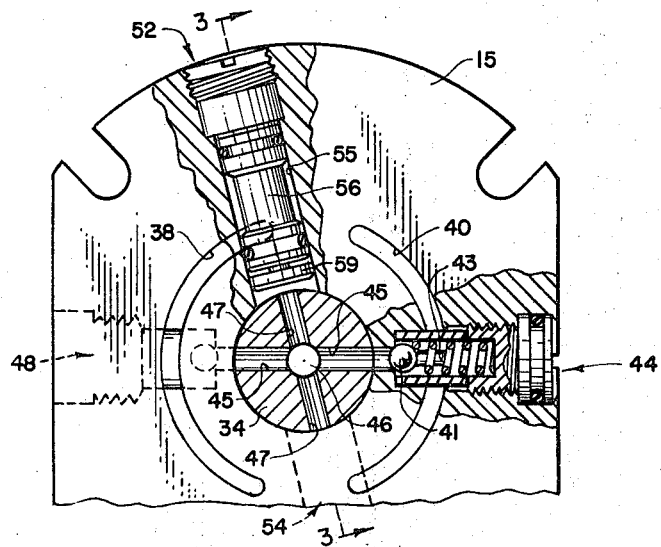
FIG. 2 is a fragmentary sectional view taken along line 2—2 of FIG. 1 with portions of the valve disc broken away.

As shown in FIG. 2, the port plate 15 includes a pair of kidney-shaped slots 38 and 40 which provide discharge and return flow paths in a closed loop circuit connecting the pump and the motor. For purposes of description, slot 38 will be referred to as the high pressure or discharge side, and slot 40 as the low pressure or return side of the closed loop flow path. If the drive shaft 13 was rotating in the opposite direction, the high and low pressure slots would be reversed.

Communicating with the transmission 10 is a low pressure charging pump 50 (FIG. 1) mechanically driven by the drive shaft 13, as symbolized by dotted line 42. The pump 50 supplies charging fluid to the transmission through passage 51 in stationary shaft 31. Passage 51 communicates with axial passage 46 in rotating main shaft 34. The restriction 72 located at the end of passage 46 maintains adequate charging pressure in passage 46 while allowing lubrication flow to the bearings 35 and 27.

Referring against to FIG. 2, located in port plate 15 is a pair of oppositely positioned check valves 44 and 48 which permit charging fluid from lateral passage 45 to flow into slots 40 and 38 respectively. Valve 44 includes a ball 41 which will unseat under charging pressure allowing fluid to flow through slit 43 into kidney slot 40. Also located in the port plate are uncoupling valve assemblies 52 and 54. Bore 55, which receives valve assembly 52, intersects slot 38, as seen in detail in FIG. 3. The valve assembly 52 includes a valve body 56 screw threaded in bore 55 and a slidable poppet 59. The valve body has a reduced diameter portion 57 communicating slot 38 with a cross passage 58. A central recess 60 in the valve body slidably receives the stem portion 62 of the poppet. When the end of stem portion 62 is in contact with the valve seat 63, flow is blocked through the central recess 60. As the stem 62 moves downward from the position illustrated in FIG. 3, fluid flows through longitudinal grooves 64 to drain passage 61. The effective area 53 of the end of stem 62 exposed to fluid pressure from passage 58 is substantially smaller than the effective area 65 on the bottom of poppet 59. The surface 65 is subject to the charging pressure through the lateral passage 47. The O-rings 66 prevent any leakage of fluid between the bore 55 and the valve body 56. Drain passages 61 in the port plate 15 provide a lubrication flow path through the bearing cavities 67 and 68 of the pump and motor, and out cross-holes 69 and 70 into the housing cavity 71. The charging fluid in central passage 46 also provides lubrication flow paths at both ends of the main shaft 34. Flow through restriction 72 passes around the end of the shaft 34 and out cross-holes 69. At the opposite end of the shaft 34 fluid passages between spring biased sleeve 73 carried by the stationary shaft 31, and the moving shaft 34 out cross-holes 70.

While the uncoupling valve of the present invention has been illustrated with the type of transmission having a rotary port plate and stationary motor block, the invention has equal utility with the type of transmission having a stationary port plate.

OPERATION

While the basic transmission is old in the art as described in detail by U.S. Pat. No. 3,313,108, a brief description of its operation will be given. A primary engine drives shaft 13 causing the cylinder block 16 to rotate, and causing reciprocation of pistons 18, due to the angular disposition of swash plate 20. Pressurized fluid is forced through the kidney slot 38 into the cylinders 22 of the motor cylinder block. Since the motor cylinder block 21 is stationary and the swash plate 30 is mounted on housing 29, the fluid pressure causes the pistons 24 to reciprocate which in turn forces swash plate 30 along with housing 29 to rotate. The output drive shaft (not shown) is driven off of gear 23 carried on housing 29.

At all times while torque is being applied to the input drive shaft 13, the charging pump 50 is supplying low pressure fluid to the center passage 46 of the transmission. Charging fluid will flow into either kidney slot 38 or 40, via passage 45 whenever pressure in either slot has dropped below the charging level, for example when starting the primary engine after some fluid has leaked from the closed loop (slots 38 and 40). Reverse flow into the charging system is prevented by check valves 44 and 48.

Figure 3:
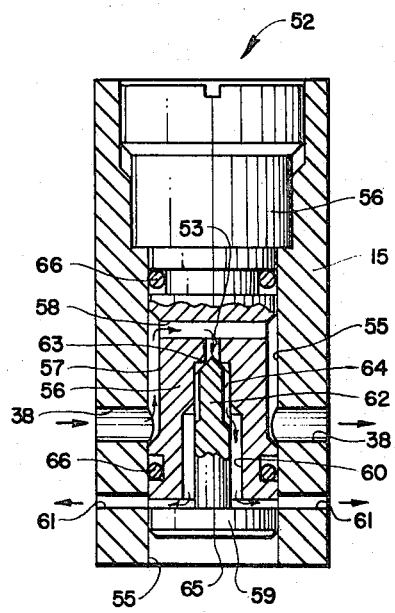
FIG. 3 is a sectional view to an enlarged scale of the uncoupling valve taken along line 3—3 of FIG. 2.
Figure 4:
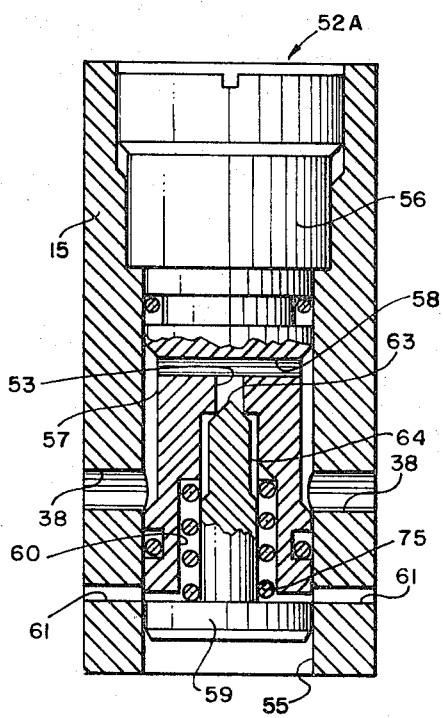
FIG. 4 is a sectional view of the uncoupling valve showing a modified form.

The uncoupling valve assembly 52, under normal operating conditions, is positioned as shown in FIG. 3. The charging pressure acts on the bottom surface 65 of the poppet urging it upward, while the high pressure in slot 38 acts on the small area 53 defined by seat 63, urging the poppet downward. Whenever charging pressure is lost, for example when the primary engine is shut down, the pressure on area 53 forces the poppet downward, allowing fluid in the closed loop circuit to drain through slot 38, passage 58, grooves 64, recess 60, passages 61, bearing cavities 67 and cross-holes 69 and 70 into housing cavity 71. When fluid is drained from the closed loop, the pump 12 and motor 14 are uncoupled, and the input shaft 13 and the output gear 23 are free to rotate independent of each other. The uncoupling valve assembly 54 is connected to the slot 40, the return side of the closed loop, and functions in the same manner as valve assembly 52.

Valve assembly 52 also acts as a high pressure relief valve whenever the transmission is overloaded. As the pressure in slot 38 approaches a damaging high level (i.e. 3000 p.s.i.), the effective force on area 53 overrides the force on area 65, and moves the poppet 59 off its seat 63 to relieve the pressure, allowing the transmission to slip until the condition is removed.

Figure 5:
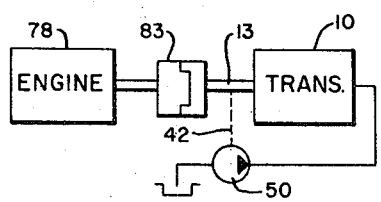
FIG. 5 is a diagrammatic view of a hydrostatic transmission showing a modified form.
Figure 6:
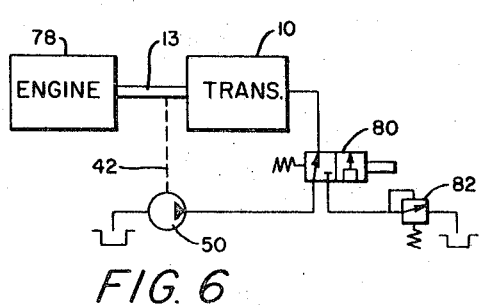
FIG. 6 is a diagrammatic view of a hydrostatic transmission showing a further modified form.

A manual override control for the uncoupling valve 52 could be utilized to declutch the transmission at will without shutting down the primary engine. One type of such a control, as seen in FIG. 6, could be a directional control valve 80 located between the charging pump 50 and the transmission 10, which upon actuation would open the charging system to drain through a low pressure relief valve 82. Another type of control would be the inclusion of a mechanical clutch 83 between the primary engine and the drive shaft 13, as illustrated in FIG. 5. Either of said controls is effective to relieve charging pressure from passage 46, causing valves 52 and 54 to drain the closed loop to uncouple the pump and motor. In FIG. 6, additional lubrication of transmission, while it is uncoupled, can be provided by maintaining a very slight pressure in the charging system due to the presence of relief valve 82.

FIG. 4

In this figure a modified form of the uncoupling valve 52A is shown with the addition of compressive spring 75 in central recess 60. The spring 75 provides a spring bias for operator 59, giving it a more positive action. Further, the spring may be sized so that the operator moves downward to the drain position when the charging pressure drops to some predetermined low pressure above zero.

Having described the invention with sufficient clarity to enable those familiar with the art to construct and use it, I claim:

1. In a hydrostatic transmission including a power driven hydraulic pump connected in driving relation to a fluid driven motor through a closed loop flow path in the port plate, the flow path incorporating a first passage communicating the pump discharge with the motor intake, and a second passage communicating the motor discharge with the pump intake, the closed loop being supplied by a fluid charging means to replace fluid lost from either passage in the loop caused by leakage, wherein the improvement comprises:

uncoupling valve means (52) communicating with the first passage having a first position allowing flow to exhaust from the first passage to a sump and a second position blocking said exhaust flow from the first passage means, the valve means including a valve operator (59) having a first area (53) responsive to pressure in the first passage means urging the operator means toward the first valve position, and a second area (65), of greater size than the first, acting in opposition to the first area, responsive to the pressure developed by the fluid charging means urging the operator toward the second valve position, whereby the operator is moved to the first valve position when a predetermined pressure differential exists between said first and second area.

2. In a hydrostatic transmission as set forth in claim 1, wherein the uncoupling valve means includes:

a valve body (56) positioned in the port plate having a central recess (60) with a valve seat (63) therein; and the valve operator means has a stem portion (62) slidably positioned in the recess having a free end shaped to seal against the valve seat when in the second valve position.

3. In a hydrostatic transmission as set forth in claim 1, wherein the uncoupling valve means includes:

a bore (55) in the port plate intersecting the first passage means;

a valve body (56) positioned in said bore having a central recess (60) with a valve seat (63) therein; and the valve operator means including a poppet slidably positioned in said bore having an end surface defining the second area, a stem portion (62) extending from the opposite end of the poppet into the central recess with its free end shaped to seal against the valve seat and define the first area whereby the poppet is free to move between the first valve position allowing fluid flow through the central recess around the stem portion to drain, and the second valve position with the poppet seated in the valve body blocking any flow through the central recess.

4. In a hydrostatic transmission as set forth in claim 3, including:
- a revolving main shaft (34) anchored to the port plate for supporting the pump and motor;
- an axial passage (46) through the main shaft connected with the fluid charging means; and
- a lateral passage (47) joining the axial passage with said bore in the port plate whereby pressure from the fluid charging means is experienced by the second area of the valve operator means.

5. In a hydrostatic transmission as set forth in claim 1, wherein the uncoupling valve means includes:
- a bore (55) in the port plate intersecting the first passage means;
- a first conduit (47) communicating the fluid charging means with said bore;
- a valve body (56) positioned in said bore between the first passage means and the first conduit, the valve body having a central recess (60) with a valve seat (63) therein; and
- the valve operator including a poppet slidably positioned in said bore having the end surface defining the second area exposed to the charging pressure through the first conduit, a stem portion (62) extending from the opposite end of the poppet into the central recess with its free end shaped to seal against the valve seat and define the first area whereby the poppet is free to move between the first valve position allowing fluid flow through the central recess around the stem portion to drain, and the second valve position with the poppet seated in the valve body blocking any flow through the central recess.

6. In a hydrostatic transmission as set forth in claim 1, wherein the pump and motor have main bearing cavities (67 and 68), the uncoupling valve means includes:
- a bore (55) in the port plate intersecting the first passage means;
- a first conduit (47) communicating the fluid charging means with said bore;
- a valve body (56) positioned in said bore between the first passage means and the first conduit, the valve body having a central recess (60) with a valve seat (63) therein;
- the valve operator including a poppet slidably positioned in said bore having a flat end surface defining the second area exposed to the charging pressure through the first conduit, a stem portion (62) extending from the opposite end of the poppet into the central recess with its free end shaped to seal against the valve seat and define the first area, whereby the poppet is free to move between the first valve position allowing fluid flow through the central recess around the stem portion, and the second valve position with the free end of the stem seated in the valve body blocking any flow through the central recess; and
- a third passage means (61) connecting the central recess with the bearing cavities of the pump and motor to provide a lubricating flow path for the fluid exhausted from the first passage means.

7. In a hydrostatic transmission as set forth in claim 1, wherein the fluid charging means is a low pressure pump mechanically connected to the power source supplying torque to the transmission whereby the charging pressure drops to zero as the drive shaft stops rotating.

8. In a hydrostatic transmission as set forth in claim 1, including a drive shaft (13) connecting the power source to the pump, a mechanical clutch positioned between the power source and the drive shaft, the fluid charging means being a low pressure pump mechanically connected to the drive shaft whereby the charging pressure drops to zero as the drive shaft stops rotating.

9. In a hydrostatic transmission as set forth in claim 1, including a manual override control means cooperating with the uncoupling valve whereby upon actuation of said control means the valve operator can be shifted to the first position.

10. In a hydrostatic transmission as set forth in claim 1, including:
- pump and motor bearing cavities (67 and 68);
- drain holes (69 and 70) in the respective bearing cavities communicating with a fluid reservoir; and
- a third passage means (61) connecting the exhaust flow from the uncoupling valve means to the bearing cavities whereby a lubrication flow path is provided for the fluid exhausted from the first passage means.

11. In a hydrostatic transmission which includes a power driven hydraulic pump and a fluid driven hydraulic motor enclosed in a housing and hydraulically interconnected in driving and driven relationship by a closed loop circuit which transmission also includes a driven charging pump the discharge port of which communicates with said closed loop circuit to replace fluid lost from that circuit by leakage during transmission operation, the improvement in such a transmission which includes a pressure responsive valve for unloading pressure fluid from said closed loop circuit to afford independent rotation of the hydraulic pump with relation to the fluid connected hyraulic motor, said valve comprising:
- a valve body (56);
- a cross passage (58) in said body interposed in the high pressure side of said loop circuit, and affording free flow of fluid therethrough;
- a central recess (60) in said body interposed between and affording flow from said first passage (58) into a low pressure sump zone (71) in the transmission housing;
- a valve seat (63) in said central recess;
- a valve member (59) reciprocable in said central recess, and having an end (53) of reduced area for seating on said valve seat, and an opposite end (65) of larger area, the seated end being exposed to fluid pressure in the high pressure side of said loop circuit, and the enlarged end (65) being exposed to the lower fluid pressure discharge of said charging pump, the different areas of the opposite ends of the valve member being so proportioned with respect to the different operating pressures to which they are respectively exposed that the smaller end of the valve member is maintained seated during normal operation of the transmission;
- whereby the valve member is unseated allowing pressure fluid to drain from said loop circuit both in response to a predetermined pressure rise in said loop circuit, and in response to a predetermined drop in the pressure of fluid discharged from said charging pump.

References Cited

UNITED STATES PATENTS

| | | |
|---|---|---|
| 3,131,540 | 5/1964 | Ritter. |
| 3,135,087 | 6/1964 | Ebert. |
| 3,243,959 | 4/1966 | Fantom. |
| 3,313,108 | 4/1967 | Allgaier et al. |

EDGAR W. GEOGHEGAN, Primary Examiner